United States Patent [19]
Mattingly et al.

[11] Patent Number: 5,141,448
[45] Date of Patent: Aug. 25, 1992

[54] APPARATUS FOR RETAINING A COUPLING RING IN NON-SELF LOCKING ELECTRICAL CONNECTORS

[75] Inventors: William R. Mattingly, Santa ana; Roy E. Kroger, Norco, both of Calif.

[73] Assignee: Matrix Science Corporation, Torrance, Calif.

[21] Appl. No.: 800,705

[22] Filed: Dec. 2, 1991

Related U.S. Application Data

[63] Continuation of Ser. No. 671,313, Dec. 2, 1991, abandoned.

[51] Int. Cl.$^5$ ............................................. H01R 13/00
[52] U.S. Cl. ...................................................... 439/314
[58] Field of Search ................................. 439/314–323

[56] References Cited

U.S. PATENT DOCUMENTS

| | | |
|---|---|---|
| 2,431,120 | 1/1944 | Howe . |
| 3,393,927 | 7/1968 | Kelley et al. ................. 439/314 |
| 3,538,485 | 11/1970 | Hennessey, Jr. ............... 439/314 |
| 3,748,888 | 7/1973 | Gerich . |
| 3,907,399 | 9/1975 | Spinner . |
| 4,131,257 | 12/1978 | Sterling . |
| 4,165,911 | 8/1979 | Laudig . |
| 4,230,008 | 10/1980 | Fornwalt et al. . |
| 4,420,203 | 12/1983 | Aug et al. . |
| 4,506,943 | 3/1985 | Drogo ............................ 439/314 |
| 4,629,272 | 12/1986 | Mattingly et al. . |
| 4,668,106 | 5/1987 | Gu . |
| 4,711,434 | 12/1987 | Haag . |
| 4,842,533 | 6/1989 | Beberman et al. . |
| 4,849,581 | 7/1989 | Larkin et al. . |
| 4,950,841 | 8/1990 | Walker et al. . |

Primary Examiner—Joseph H. McGlynn
Attorney, Agent, or Firm—Robbins, Dalgarn, Berliner & Carson

[57] ABSTRACT

An apparatus for retaining a coupling ring such as a canted washer or spring for use in non-self locking electrical connectors is disclosed. The canted washer or spring having uniform frustoconical surface is positioned between the plug and coupling ring providing a known spring force response between the coupling ring and plug shell shoulder. In one embodiment, the canted washer is used in a non-bayonet electrical connector with a swaged coupling ring. An alternative embodiment is described as a double turn canted spring used in conjunction with a non-swaged, grooved coupling ring. The apparatus is used in both metal and composite non-bayonet electrical connectors. Configuration to a particular cant for either the canted washer or spring is calculable using known factors such as; size, material thickness, and the modulus of the material. A canted washer or wave spring for use in electrical connectors subjected to high and low temperature environments is also disclosed.

26 Claims, 3 Drawing Sheets

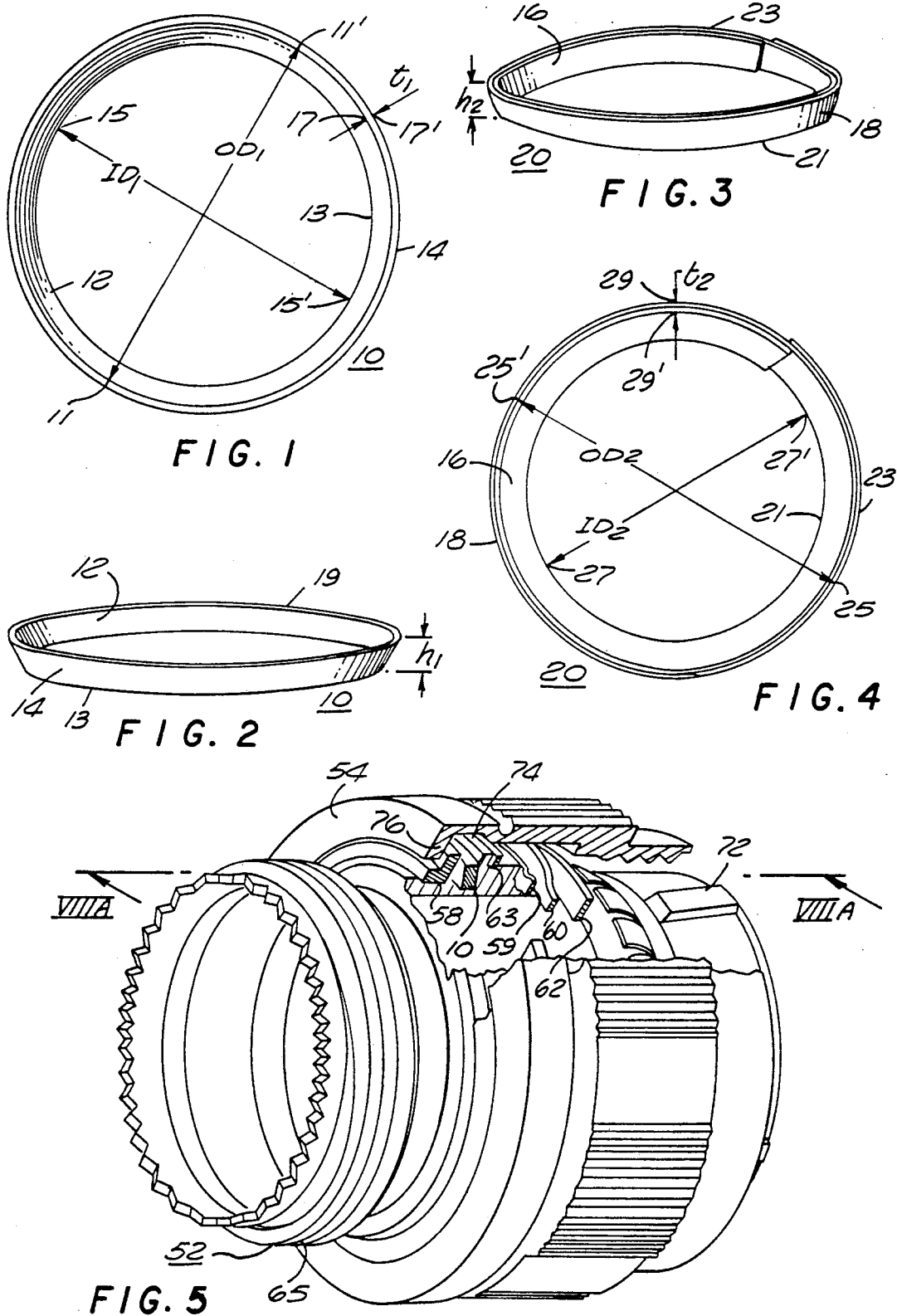

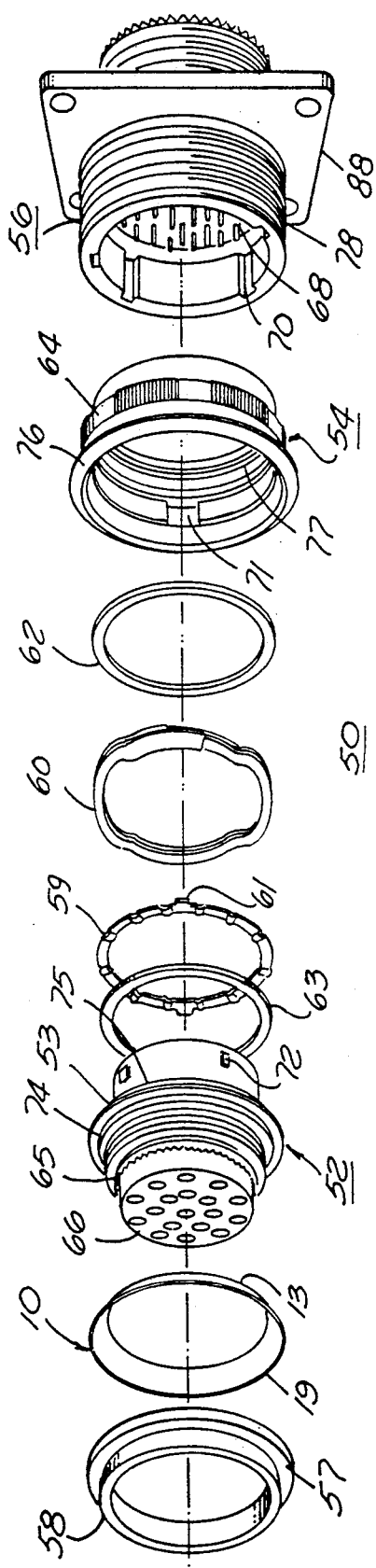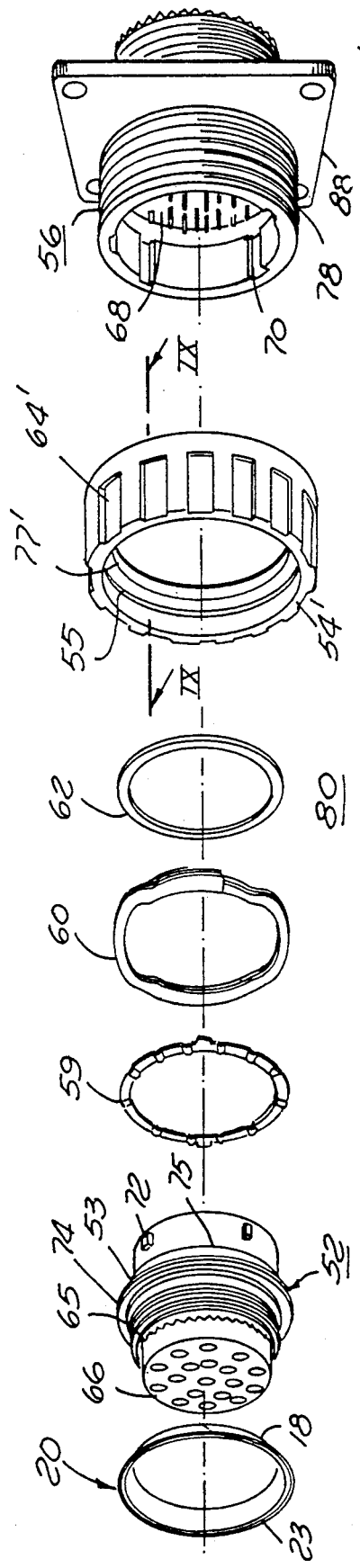
FIG. 6
FIG. 7

APPARATUS FOR RETAINING A COUPLING RING IN NON-SELF LOCKING ELECTRICAL CONNECTORS

This is a continuation of Ser. No. 671,313, filed Dec. 2, 1991, and now abandoned.

BACKGROUND OF THE INVENTION

The present invention relates to a canted washer or spring; and more particularly a washer or spring retaining a coupling ring in locking engagement for non-self locking electrical connectors.

The wave spring is commonly used within an electrical connector, particularly between the connector coupling ring and the mated plug and receptacle subassemblies. The wave spring has a spring deflection response which is variable dependent upon the manufacturing tolerances of that spring and the amount of compression to which it is subjected within the electrical connector.

A wave spring traditionally used in the fabrication of electrical connectors is operable to be fabricated inexpensively. However, its inability to maintain deflection and its inability to be manufactured to specific tension requirements limits its use.

A non-bayonet electrical connector consists of a plug, a receptacle and a coupling ring. The plug and receptacle matingly engage within the coupling ring. The coupling ring has interior threads which engage the exterior threads of the receptacle. After the plug and receptacle matingly engage the coupling ring is turned pulling the plug and receptacle tightly together. The mated plug and receptacle bottom out when their engaging surfaces meet. The plug has ratchet teeth and a plug shoulder between the engaged plug receptacle. A dimpled clutch plate surrounding the plug engages the teeth of the plug locking the coupling ring in place.

Friction washers or wave springs are also used in conjunction with the clutch plate to facilitate locking engagement of the coupling ring around the plug and receptacle. A non-bayonet electrical connector incorporating the traditional friction washer or wave spring is locked using tools or the human hand. Force applied to tighten the coupling ring to lock down the ratcheted plug within the coupling ring to the last rachet tooth ensures that there is no looseness or "play" between the mated subassemblies and the coupling ring. When the mated electrical connector is exposed to high vibrational forces, any play between the engaged plug and receptacle and the coupling ring results in a loosening of the coupling ring.

Specifically, hand tightening of the coupling ring does not secure the coupling ring around the mated subassemblies to the last available ratchet. The human hand cannot apply sufficient force to tighten the coupling ring. Invariably, the rachet teeth of the plug fall between the dimples on the clutch plate. This failure to secure the coupling ring to the final ratchet results in the decoupling of the mated connector when it is subjected to high vibrational environments.

It is known, that a Belleville spring consists of an apertured disc made of spring metal and having a generally frustoconical shape. When force is applied to the Belleville spring in an axial direction, the spring deflects and initially exerts a relatively high resistive force which increases rapidly as a non-linear function of the deflection of the spring.

With continued deflection of the Belleville spring, the resistive force exerted by the spring decreases gradually as a substantially linear function of deflection until the spring toggles and once again exerts a force which increases non-linearly with deflection. With many applications, only the linear force/deflection characteristics of the spring are usable.

Washers and wave springs, having non-uniform surfaces, have been fabricated.

U.S. Pat. No. 2,431,120 issued to E. E. Howe Nov. 18, 1947 entitled "Joint for Tubing" discloses a cone shaped thrust plate held in place by a series of springs where the springs employ a corrugated washer. This corrugated spring washer, while split, is circular in configuration and comprises a multiplicity of random dimples or individual waves within the surface of the corrugated washer. The washer in this application is used in high pressure joints for tubing or pipes having thin walls providing a flexible connection for tubing including an elastic compressible sealing cushion member.

U.S. Pat. No. 4,711,434 issued to D. L. Haag Dec. 8, 1987 entitled "Spring Disk", discloses a solid spring disk made of a resiliently yieldable material shaped into a shallow cone having a corrugated surface defined by a plurality of angularly spaced triangular segments of identical size and shape disposed together upon the surface of the cone in a side-by-side arrangement.

The solid spring disk of the Haag device provides an improved spring disk which when compared with springs of the same linear force of deflection are smaller in size and require less material for fabrication. The Haag patented spring is a solid spring and is not a washer.

U.S. Pat. No. 3,748,888 issued to A. J. Gerich Jul. 31, 1973 entitled "Bi-metallic Snap Disk and Method and Apparatus for Making Same" discloses a snap disk having peripherally spaced radially extending scallops which stiffen the disk independent of the cord height of the disk.

The bi-metallic snap disk of the Gerich patent has two positions of mechanical stability. When the temperature of the snap disk is below a predetermined temperature which has been determined during the manufacturing stage, the disk exhibits one position of stability. When the temperature of the disk is raised to a second predetermined temperature or greater, the disk snaps into a second predetermined position of stability and remains in that second position of stability until the temperature of the disk is subjected to drops below the second predetermined temperature. The inventive concept of the Gerich snap disk does not describe a washer format.

U.S. Pat. No. 4,668,106 issued to A. L. Gu on May 26, 1987, entitled "Thrust Bearing Underspring", discloses a foil thrust bearing underspring having alternate upper ridges and lower ridges wherein the upper ridges have a height greater than the lower ridges. The Gu device is fabricated using strict tolerances thereby producing a device having a predetermined spring capability. This resiliency o spring rate of the underspring is varied by changing the thickness of the upper and lower ridges. The space that occurs between the adjacent lower ridges has a marked effect on the stiffness of the spring. The stiffness of the spring generally outwardly converges in order to better accommodate hydrodynamic pressure forces which increase radially upon the spring.

SUMMARY OF THE INVENTION

The present invention, an apparatus for retaining a coupling ring in locking engagement around a mated plug and receptacle in a non-self locking electrical connector, includes a frustoconical washer or spring having a uniform surface producing a predetermined spring tension response to deflection. The canted washer or spring also has a predetermined thickness, internal diameter, external diameter and material modulus, and it compresses when subjected to force from an engaging surface integral to the coupling ring.

The canted washer or spring solves a problem of failure to fully engage an electrical connector coupling ring in a non-bayonet electrical connector.

The canted washer is manufacturable in a controlled manner having consistently reliable characteristics. An embodiment of the invention incorporates the canted washer beneath a swaged coupling ring.

An alternative embodiment of this invention includes a canted spring having a uniform frustoconical surface and predetermined; thickness, internal diameter, external diameter and material modulus. The canted spring is manufacturable in a controlled manner having consistently reliable characteristics. This alternative embodiment of the invention incorporates the canted spring beneath a non-swaged, grooved coupling ring.

The general aim of the present invention is to provide a canted washer and a canted spring for use in any non-self locking electrical connector, providing full locking engagement of the coupling ring, either swaged or non-swaged around the mated connector plug and receptacle.

It is an object of the invention to provide a non-self locking electrical connector incorporating the canted spring or canted washer which does not decouple when subjected to high vibrational environments.

The canted washer and canted spring, are both useful in non-metal composite, and tooled metal non-bayonet electrical connectors.

The canted washer or canted spring are manufacturable in a variety of resiliently yielding materials, including but not limited to, beryllium copper for low temperature environment use and 17-7ph stainless steel, for high temperature environment use.

A method of providing non-self locking electrical connectors featuring the canted washer and canted spring is also described.

These, as well as other features of the invention, will become apparent from the detailed description which follows considered together with the appended drawings.

BRIEF DESCRIPTION OF THE DRAWINGS

A complete understanding of the present invention and the above advantages may be gained from a consideration of the following description of the preferred embodiments taken in conjunction with the accompanying drawings in which:

FIG. 1 is a top plan view of a canted washer;

FIG. 2 is a side perspective view of the canted washer;

FIG. 3 is a side perspective view of a canted spring;

FIG. 4 is a top plan view of the canted spring;

FIG. 5 is an side perspective cutaway view of a swaged coupling ring and plug and the canted washer;

FIG. 6 is an exploded view of an electrical connector with the swaged coupling ring and the canted washer;

FIG. 7 is an exploded view of an electrical connection with a non-swaged coupling ring and canted spring;

DETAILED DESCRIPTION

Figure 8A:
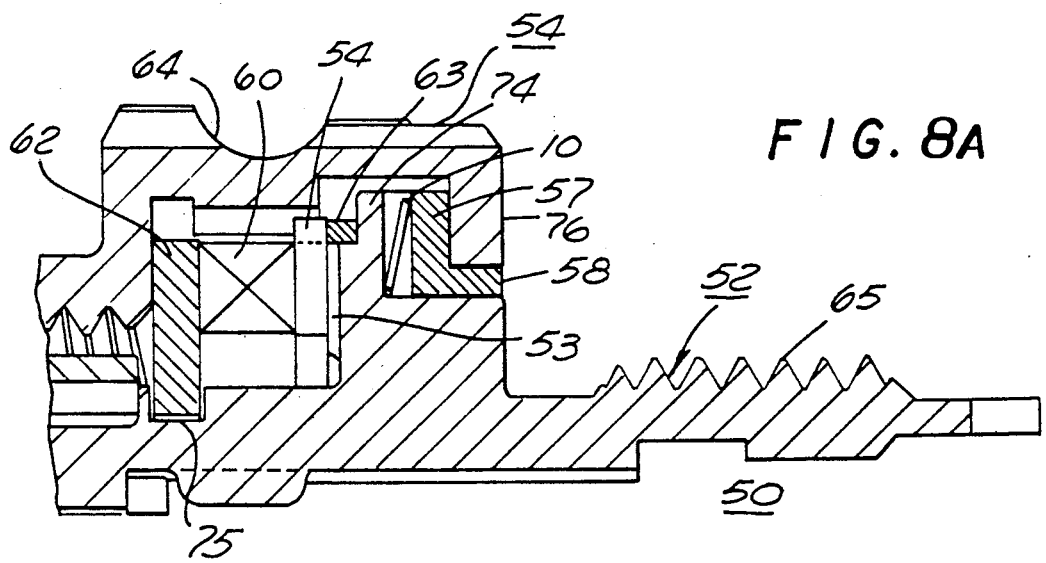
FIG. 8A is an enlarged cross sectional view taken along line VIII—VIII of FIG. 5 of the electrical connector with the swaged coupling ring and the canted washer in a non-compressed state.

The invention, includes a canted washer or a canted spring used in conjunction with a coupling ring having an integral retaining portion for a non-self locking, electrical connector. The canted washer or canted spring exhibits the beneficial, known spring response characteristics of a Belleville spring providing full locking engagement of a swaged or non-swaged coupling ring.

The canted washer or canted spring is positioned within the mated electrical connector compressed against the plug and the shoulder of a swaged coupling ring, or within the groove of a non-swaged coupling ring.

The invention provides a predetermined spring response to the compression produced by the locking engagement of the coupling ring around the mated plug and receptacle sub-assemblies.

The thread force of the threaded portion of the receptacle against the canted washer pulls the swaged coupling ring thread tightly against the receptacle thread preventing bottoming out of the electrical connector before the final rachet of the plug is engaged. A "play" free connection is thus provided.

After metal-to-metal "bottoming out" occurs between the engaging surfaces of the plug and receptacle, the coupling ring continues to turn an additional amount providing a continuous complete deflection of the canted washer or spring and additional thread engagement.

Use of the canted washer or canted wave spring allows the coupling ring surrounding the mated plug and receptacle sub-assemblies to be secured to the last ratchet, thereby eliminating "play" in the locked connector. Elimination of this "play" results in less opportunity for the electrical connector to decouple when subjected to high vibrational environments such as in motors or engines.

Specifically, the canted washer 10 or canted wave spring 20 as shown in FIGS. 1 through 4 is formed from an initial flat and circular blank of spring metal such as steel or other resiliently yieldable material. Importantly, the entirety of the blank is not solid and contains an orifice defining a predetermined outside and inside diameter.

FIG. 1 is a top plan view of a canted washer 10. As shown here the canted washer 10 has an interior orifice and frustoconical shape. The canted washer 10 has inside surface 12, and outside surface 14. The OD1 is measured between the extreme exterior edges 11, 11' of the circumference of the canted washer 10 while the ID1 is measured from interior edge 15 to interior edge 15' at the base 13.

The washer 10 of FIG. 1 has a predetermined thickness t1, measured between edges 17, 17' encircling the top 19 or base 13 of the washer 10. Dimensional values that would be representative of the canted washer 10 but should not be considered a limitation include; an OD1 of 1.107 inches, and ID1 of 0.901 inches and a t1 of 0.015 inches. The canted washer 10 is in one embodiment fabricated of 17-7 ph (precipitating hardness) stainless steel.

FIG. 2 is a side perspective view of the canted washer 10. The canted washer 10 shown here has a frustoconical configuration with interior surface 12 and exterior surface 14. The cant or tapered shape is the decrease in the inside height of the canted washer 10 from the top 19 to the base 13. This cant is calculated based upon the thickness t1 of the material in the washer 10 and the overall size of the washer 10 itself. The inside height h1 of the washer 10 is in this example 0.025 inches as measured from the base 13 to the top 19.

FIG. 3 is a side perspective view of the canted spring 20, an alternative embodiment. In this example, the canted spring 20 is a double turn spring having a exterior surface 18 and interior surface 16. A double turn spring contains two overlapping "turns" of spring material. The overall inside height h2 of the spring 20, is in this example, 0.25 inches measured from the top 23 of the spring 20 to the base 21. Again, the cant of the spring 20 is determined by the overall size of the spring 2 and the thickness of the material used in its fabrication. The cant of the spring 20 is the decrease in inside height from the top 23 of the spring to the base 21.

FIG. 4 is a top plan view of the canted spring 20 having an outside diameter (OD2) measured between the exterior edges 25, 25' of the spring 20 across both turns of spring material. The inside diameter (ID2) is measured between the inside edges 27, 27' of the spring 20. The thickness of the material t2 is the measured distance between the interior surface 16 and the exterior surface 18 of both turns of the spring 20 shown here at points 29, 29'.

Fabrication of the canted washer or the canted spring of 17-7 ph stainless steel produces a washer or spring ideal for use in electrical connectors subjected to high heat such as in the firewall of an engine. The canted washer 10 or spring 20 fabricated of beryllium copper is ideal for use in low heat environmental applications.

FIG. 5 is a side perspective cutaway view of a swaged coupling ring and a plug with a canted washer 10. The coupling ring 54 is shown cut away above the plug 52. A gap filling L-shaped friction lock washer 58 is shown between the shoulder 76 of the swaged coupling ring 54 and the canted washer 10. Plug shoulder 74 is shown with the canted washer 10 on one side and a flat friction washer 63 on the opposing side. The flat friction washer 63 prevents galling from occurring between the plug shoulder 74 and coupling ring 54. The clutch plate 59 is positioned between the rachet teeth 53 of the plug 52 and wave spring 60. A rear flat friction washer 62 is shown behind the wave spring 60.

FIG. 6 is an exploded view of an electrical connector 50 with a swaged coupling ring 54, a plug sub assembly 52, a receptacle sub-assembly 56 and the canted washer 10. A flat, friction lock washer 58 compresses the canted washer 10 against a plug shoulder 74. The base 13 of the canted washer 10 rests against the plug shoulder 74 while the top 19 of the washer 10 rests beneath the L-shaped washer 58. An alternative friction lock washer 58 having an "L" type configuration is shown here having lip 57. Either the flat friction lock washer, or "L" style friction lock washer functions as a gap filler between the shoulder of the coupling ring and the canted washer. The plug insert 66 supports electrical lead lines, not shown here, for the transmission of electrical signals through the matingly engaged electrical connector 50. The keys 72 project from the exterior surface of the plug shell sub-assembly 52 to facilitate mating engagement with the key ways 70 of the receptacle sub-assembly 56. A clutch plate 59, a double-turn wave spring 60, and a flat friction washer 62 are positioned against the opposing side of the plug shoulder 74 from the canted washer 10. The flat friction washer 63 prevents galling from occurring between the plug shoulder 74 and the coupling ring 54. The receptacle sub-assembly 56 shown here is mountable via a wall mounting flange 88 to the fire wall of an engine, not shown here. The receptacle threads 78 engage the coupling ring threads 77 within the swaged coupling ring 54.

The electrical connector 50 contains a plug shell sub-assembly 52 which matingly engages the receptacle shell sub-assembly 56, as shown in FIG. 6. A receptacle insert 68 supports the electrical leads lines (not shown here) from the plug insert 66, not shown here. Upon mating engagement, the swaged coupling ring 54 is slipped over the mated plug shell 52 and receptacle shell 56 assemblies. The swaged coupling ring 54 is hand tightened using the finger flutes 6 surrounding the coupling ring 54. A swaged lip 76 of the coupling ring 54 locks over the plug shell shoulder 74, and the L-shaped friction washer 58 and canted washer 10.

FIG. 7 is an exploded perspective view of an electrical connector 80 with a non-swaged coupling ring 54, the plug sub-assembly 52 and a double turn canted spring 20. The double turn canted spring 20 fits over the plug sub-assembly 52 over the plug insert 66 and plug threads 65. The base 18 of the double turn canted spring 20 is positioned against plug shoulder 74. A groove 75, inscribed within the plug shell sub assembly 52 retains the flat friction washer 62. In this embodiment, the mating engagement of the plug sub-assembly 52, and the receptacle sub-assembly 56 is assisted by keys 72, projecting from the surface of the plug sub-assembly 52, interfitting key ways 70 inscribed within the interior surface of the receptacle 56. The receptacle sub-assembly 56 is wall mountable via the wall mounting flange 88. Upon mating engagement of the plug 52 and the receptacle 56 the threads 78 of the receptacle 56 interfit the non-swaged coupling ring 54 threads 77.

It is important that the spring response of both the canted washer and the canted spring are consistent and predeterminable.

The canted washer, a spring, deflects when the coupling ring is locked into place. As the coupling ring turns it places a force against the canted washer from the shoulder of the swaged coupling ring or from the groove pressing against the canted washer. When the canted washer or spring deflects it produces a spring force opposing the swage or groove. When the canted washer or spring is fully compressed the coupling ring is fully locked around the mated plug and receptacle.

The spring response of the canted washer and canted spring is calculated using a known Belleville spring load formula and a correction factor of 0.78.

The Belleville spring load formula used to calculate the spring load P produced when a Belleville spring deflects is as follows:

$$P = Kf[(h-f)(h-f/2)(t)+t^3]$$

$$P = Kft^3$$

$$K = E/(1-\sigma^1)Ma^2$$

where:
h = Height, inside of the Belleville Spring
σ = Poisson's ratio (0.3 for steel)
E = Modula of the material used in the Belleville spring (29.5 × 10⁶ for steel as an example)
M = Derived from Ratio O.D./I.D. and a chart, for example O.D./I.D. = 1.22 ..
M = 0.27 .
f = Deflection in inches of the Belleville spring spring
t = Thickness of the Belleville spring.

This Belleville spring load formula is based on the internal diameter (I.D.) of the canted washer or canted spring as one-half the outside diameter (O.D.).

However, the canted washer and double turn canted spring of this invention do not exhibit these specific design characteristics. A necessary correction factor of 0.78, multiplied by the Belleville spring equation results, produces mathematical results consistent with empirical test results.

Table I shows the calculated results (Calc Load), calculated with a correction factor of 0.78 (0.78 × Calc Load) and the empirical results of two tests conducted on two separate (1st, 2nd Action load) canted washers having thicknesses of, for example, 0.015 inches, 0.018 inches, and 0.020 inches, where deflection occurred in 0.005 (inches) increments.

For example:

TABLE I

CANTED WASHER/SPRING EVALUATION
FORCE VS DEFLECTION

| Inches THICK | Inches DEFL | CALC LOAD (lbs) | .78X CALC LOAD (lbs) | 1ST PART ACTUAL LOAD (lbs) | 2ND PART ACTUAL LOAD (lbs) |
|---|---|---|---|---|---|
| .015 | .005 | 14.33 | 11.18 | 10 | 9 |
|  | .010 | 22.04 | 17.19 | 16 | 16 |
|  | .015 | 25.35 | 19.77 | 24 | 22 |
|  | .020 | 26.45 | 20.63 | 20 | 19 |
| .018 | .005 | 21.22 | 16.55 | 15 | 15 |
|  | .010 | 33.44 | 26.08 | 26 | 26 |
|  | .015 | 40.90 | 31.90 | 33 | 34 |
|  | .020 | 45.71 | 35.65 | 35 | 36 |
| .020 | .005 | 25.96 | 20.24 | 20 | 22 |
|  | .010 | 43.11 | 33.63 | 30 | 34 |
|  | .015 | 54.38 | 42.42 | 43 | 45 |
|  | .020 | 62.70 | 48.91 | 45 | 48 |

As shown in Table I, use of the correction factor of 0.78 times the calculated results of the Belleville spring load formula produces mathematical results comparable to empirical test results. This predictability of force response as a result of deflection, is critical in the determination of the physical characteristics and materials used in the fabrication of the canted washer or canted spring.

The degree of deflection of the canted washer or spring, in this embodiment falls within the range of 0.000 to 0.025 inches. This deflection amount is representative only and should not be construed as a limitation.

FIG. 8A is a cross-sectional view of the electrical connector 50 taken along line VIII—VIII, more clearly shown in FIG. 5. The swaged coupling ring 54 is shown not fully locked around the mated plug 52, and the canted washer 10 is in a non-compressed state. After mating engagement of the plug 52 and the receptacle 56 (not shown here), the swaged coupling ring 54 is tightened around the mated connector subassemblies by turning the coupling ring using the finger flutes 64.

As shown here, the shoulder 76 of the coupling ring 54 captivates a flat or legged L-shaped friction washer 58. For this specific example an L-shaped friction washer 58 with lip 57 serves as a gap filler between canted washer 10 and shoulder 75. The canted washer 10 encircles the plug 52 beneath the coupling ring 54, and is positioned between the L-shaped friction washer 58 and the plug shoulder 74.

Also, positioned beneath the coupling ring 54, shown projecting from the opposite side of the plug shoulder 74 is rachet 53 engaging the dimples, not shown here, of clutch plate 59. Clutch plate 59 is supported by wave spring 60 which serves to maintain its position. The height of the dimples on clutch plate 59 is equal to the deflection of wave spring 60. Flat friction washer 62 is shown captivating wave spring 60. An optional groove 75 is shown here inscribed in the plug 52. A flat friction washer 63 positioned between the plug shoulder 74 and the coupling ring 54 prevents galling during repeated mating engagement.

Figure 8B:
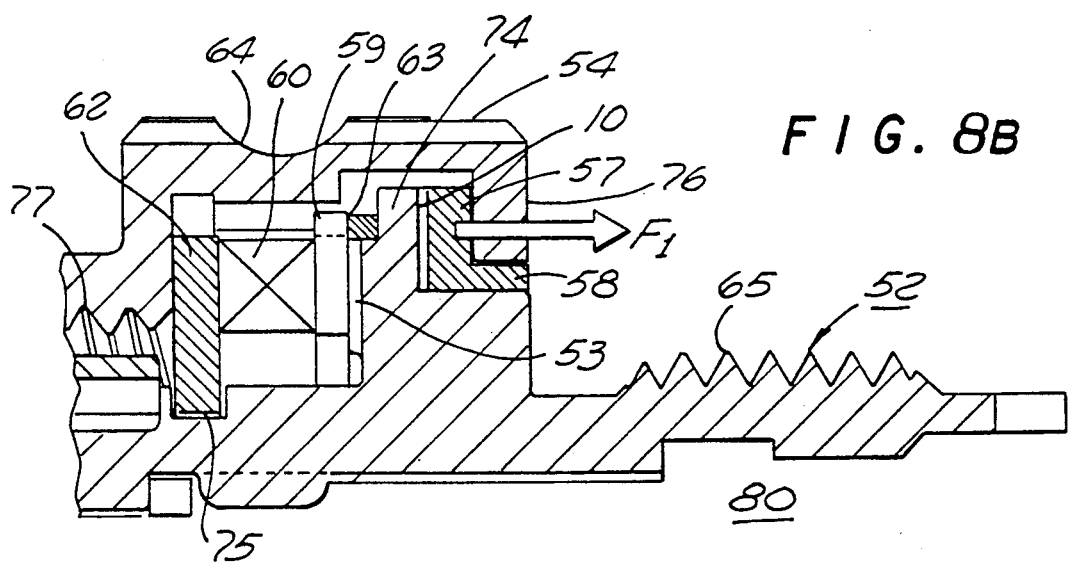
FIG. 8B is an enlarged cross sectional view taken along line VIII—VIII of FIG. 5 of the electrical connector with the swaged coupling ring and the canted washer in a compressed state.

FIG. 8B is a cross-sectional view of the electrical connector 50 taken along line VIII—VIII of FIG. 5 the swaged coupling ring 54 after it has been lockingly engaged around the plug 52. The canted washer 10 in FIG. 8B is in the compressed state against plug shoulder 74 and L-shaped friction washer 58. The compressed canted washer 10 deflects in response to the compression by leg 57 of friction washer 58. A spring load response from the canted washer 10, shown here as force F1 retains the swaged coupling ring 54 by pulling the coupling ring threads 77 against the threads 78 of the receptacle 56 (not shown here).

Figure 9:
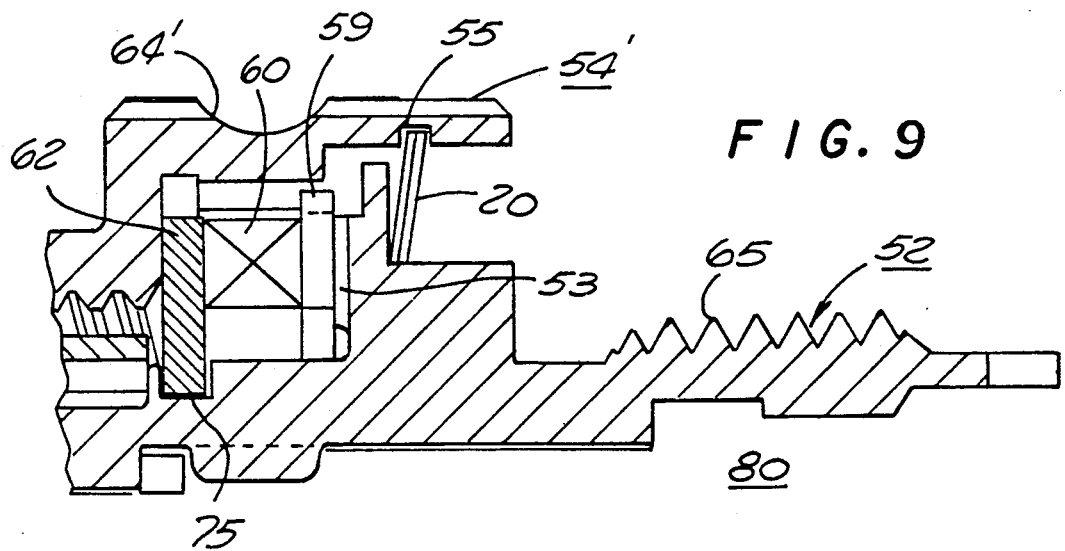
FIG. 9 is an enlarged cross sectional view taken along line IX—IX of FIG. 7 of the electrical connector with the non-swaged coupling ring and the canted spring, in the non-compressed state.

FIG. 9 is a cross-sectional view of the electrical connector 80, taken along lines IX—IX more clearly shown in FIG. 6, of the non-swaged coupling ring 54 and the canted spring 20. The non-swaged coupling ring 54' is inscribed with a groove 55 to lockingly engage the canted wave spring 20.

In this alternative embodiment, the non-swaged coupling ring 54' retains the double turn canted spring within the groove 55. The canted spring 20 is shown in the non-compressed state against the plug shoulder 74 of plug 52. Compression of the spring 20 occurs when the finger flutes 64' of the non-swaged coupling ring are turned. The rachet teeth 53 on the opposite side of shoulder 74 engage the dimples (not shown here) of the clutch plate 59. Wave spring 60 is captivated by friction washer 62, which in this example is held within a groove 75 inscribed into the plug 52.

The electrical connectors described by these embodiments are commonly fabricated from tooled metal. However, it is within the scope of the invention to provide a frustoconical washer or spring with a high fiber or low fiber composite molded electrical connector.

While particular embodiments of the invention have been shown and described, it will be obvious to those skilled in the art that changes and modifications can be made without departing from the invention in its broader aspects and therefore the appended claims are intended to cover all such changes and modifications a followed in the true spirit and scope of the invention.

What is claimed:

1. An apparatus for locking a non-self locking electrical connector, comprising:
   a plug having a plug shoulder;
   a receptacle, said receptacle matingly engaging said plug;
   a coupling ring cooperatively associated with said matingly engaged plug and receptacle;
   a means for engaging disposed within said coupling ring; and
   a frustoconical means for deflecting disposed between said plug shoulder and said means for engaging, said frustoconical means for deflecting having a predetermined; thickness, external diameter, internal diameter, inside height and material modulus providing a known spring response to deflection.

2. The apparatus as defined in claim 1 wherein said non-self locking electrical connector is formed from metal.

3. The apparatus as defined in claim 1 wherein said non-self locking electrical connector is formed from composite material.

4. The apparatus as defined in claim 1 wherein said means for engaging is formed by the shoulder of a swaged coupling ring.

5. The apparatus as defined in claim 1 wherein said means for engaging is formed by a non-swaged coupling ring having a portion defining a groove.

6. The apparatus as defined in claim 1 wherein said frustoconical means for deflecting is a canted washer.

7. The apparatus as defined in claim 1 wherein said frustoconical means for deflecting is a canted spring.

8. The apparatus as defined in claim 1 wherein said frustoconical means for deflecting is formed from beryllium copper.

9. The apparatus as defined in claim 1 wherein said frustoconical means for deflecting is formed from 17-7 ph stainless steel.

10. The apparatus as defined in Clam 1 wherein said frustoconical means for deflecting deflects in the range of from 0.000 to 0.025 inches.

11. A method of providing an apparatus for locking a non-self locking electrical connector, and said method comprising the steps of:
    providing a plug having a plug shoulder;
    providing a receptacle, said receptacle matingly engaging said plug;
    providing a coupling ring cooperatively associated with said matingly engaged plug and receptacle;
    providing a means for engaging disposed within said coupling; and
    providing a frustoconical means for deflecting disposed between said plug shoulder and said means for engaging said frustoconical means for deflecting have a predetermined; thickness, external diameter, internal diameter inside height and material modulus providing a known spring response to deflection.

12. A coupling ring retainer for a non-self locking electrical connector, comprising:
    a receptacle, said receptacle matingly engaging said plug;
    a coupling ring having a shoulder, said coupling ring cooperatively associated with said matingly engaged plug and receptacle;
    a friction washer positioned proximate said plug shoulder and said shoulder of said coupling ring; and
    a frustoconical washer disposed between said plug shoulder and said friction washer, said frustoconical washer having a uniform surface and a predetermined; thickness, external diameter, internal diameter, inside height and material modulus, said frustoconical washer providing a known spring response to deflection.

a coupling ring retainer as defined in claim 12 wherein said non-self locking electrical connector is formed from metal.

13. The coupling ring retainer as defined in claim 12 wherein said non-self locking electrical connector is formed from composite material.

14. A coupling ring retainer as defined in claim 12 wherein said friction washer is a planer washer.

15. The coupling ring retainer as defined in claim 12 wherein said friction washer is an L-shaped washer.

16. The coupling ring retainer as defined in claim 12 wherein said frustoconical washer is formed from 17-7 pH stainless steel.

17. The coupling ring retainer as defined in claim 12 wherein said frustoconical washer is formed from beryllium copper.

18. The coupling ring retainer as defined in claim 12 wherein said frustoconical washer deflects in the range of from 0.000 to 0.025 inches.

19. A method of providing a coupling ring retainer for a non-self locking electrical connector, said method comprising the steps of:
    providing a plug having a plug shoulder;
    providing a receptacle, said receptacle matingly engaging said plug;
    providing a coupling ring having a swage, said coupling ring cooperatively associated with said matingly engaged plug and receptacle,
    providing a friction washer positioned proximate said plug shoulder and said swage of said coupling ring; and
    providing a frustoconical washer disposed between said plug shoulder and said friction washer, said frustoconical washer having a uniform surface and a predetermined; thickness, external diameter, internal diameter, inside height and material modulus, said canted washer providing a known spring response to deflection.

20. A coupling ring retainer for a non-self locking electrical connector, comprising:
    a plug having a plug shoulder;
    a receptacle, said receptacle matingly engaging said plug;
    a non swaged coupling ring having an interior portion defining a groove, said non swaged coupling ring cooperatively associated with said matingly engaged plug and receptacle; and
    a frustoconical spring disposed between said plug shoulder and said groove of said non-swaged coupling frustoconical ring, said spring having a uniform surface, and a predetermined; thickness, external diameter, internal diameter, inside height and material modulus, said frustoconical spring providing a known spring response to deflection.

21. A coupling ring retainer as defined in claim 20 wherein said non-self locking electrical connector is formed from metal.

22. A coupling ring retainer as defined in claim 20 wherein said non-self locking electrical connector is formed from composite material.

23. The coupling ring retainer as defined in claim 20 wherein said frustoconical spring is formed from 17-7 pH stainless steel.

24. The coupling ring retainer as defined in claim 20 wherein said frustoconical spring is formed from beryllium copper.

25. The coupling ring retainer as defined in claim 20 wherein said frustoconical spring deflects in the range of from 0.000 to 0.0025 inches.

26. A method of providing a coupling ring retainer for a non-self locking electrical connector, said method comprising the steps of providing a plug having a plug shoulder;

providing a receptacle said receptacle matingly engaging said plug;

providing a non swaged coupling ring having a internal portion defining a groove, said non swaged coupling ring cooperatively associated with said matingly engaged plug and receptacle; and providing a frustoconical spring disposed between said plug shoulder and said groove of said non-swaged coupling ring, said frustoconical spring having a uniform surface, and a predetermined thickness, external diameter, internal diameter, inside height and material modulus, said frustoconical spring providing a known spring response to deflection.

* * * * *